(12) United States Patent
Band et al.

(10) Patent No.: US 7,544,646 B2
(45) Date of Patent: Jun. 9, 2009

(54) METHOD FOR LUBRICATING A SOOTBLOWER

(76) Inventors: Thomas Michael Band, 28 Strickland Way, Glen Mills, PA (US) 19342; H. Carl Walther, 166 Saw Mill Rd., Landenberg, PA (US) 19350; Jon Lee Howell, 56 Rawlings Dr., Bear, DE (US) 19701

( * ) Notice: Subject to any disclaimer, the term of this patent is extended or adjusted under 35 U.S.C. 154(b) by 614 days.

(21) Appl. No.: 11/241,567

(22) Filed: Sep. 30, 2005

(65) Prior Publication Data

US 2007/0295287 A1    Dec. 27, 2007

Related U.S. Application Data

(60) Provisional application No. 60/616,267, filed on Oct. 6, 2004.

(51) Int. Cl.
*C07C 15/24* (2006.01)
*C10M 143/00* (2006.01)
*C10M 111/02* (2006.01)
*C10M 147/02* (2006.01)
*C10M 169/00* (2006.01)

(52) U.S. Cl. .................. 508/588; 508/589; 508/136
(58) Field of Classification Search ................ 508/136, 508/130, 588, 589
See application file for complete search history.

(56) References Cited

U.S. PATENT DOCUMENTS

| | | | |
|---|---|---|---|
| 2,668,978 A | 2/1954 | DeMart | |
| 3,432,432 A | 3/1969 | Dreher | |
| 3,439,376 A | 4/1969 | Nelson et al. | |
| 3,536,624 A | 10/1970 | Christian et al. | |
| 3,585,673 A | 6/1971 | Nelson et al. | |
| 3,810,874 A | 5/1974 | Mitsch et al. | |
| 3,955,417 A | 5/1976 | Smith et al. | |
| 3,981,812 A | 9/1976 | Zletz | |
| 4,132,660 A * | 1/1979 | Christian et al. ............ 508/270 |
| 4,174,549 A | 11/1979 | Michelson | |
| 4,248,180 A | 2/1981 | Sullivan et al. | |
| 4,360,645 A | 11/1982 | Krespan et al. | |
| 4,375,710 A | 3/1983 | Hammond | |
| 4,421,067 A | 12/1983 | Krowech | |
| 4,454,840 A | 6/1984 | Dziubakowski | |
| 4,475,482 A | 10/1984 | Moss et al. | |
| 4,692,378 A | 9/1987 | Ishihara et al. | |
| 4,753,744 A | 6/1988 | Calloni et al. | |
| 4,757,145 A | 7/1988 | Caporiccio et al. | |
| 4,803,005 A * | 2/1989 | Juhlke et al. ................ 508/582 |
| 4,803,959 A | 2/1989 | Sherrick et al. | |
| 5,028,219 A | 7/1991 | Schuetz et al. | |
| 5,065,472 A | 11/1991 | Carpenter et al. | |
| 5,090,087 A | 2/1992 | Hipple et al. | |
| 5,154,845 A | 10/1992 | Williams | |
| 5,202,480 A | 4/1993 | Bierschenk et al. | |
| 5,209,324 A | 5/1993 | Högbacka | |
| 5,237,718 A | 8/1993 | Brown | |
| 5,267,533 A | 12/1993 | Smith | |
| 5,268,405 A | 12/1993 | Ojakaar et al. | |
| 5,299,533 A | 4/1994 | Johnston, Jr. et al. | |
| 5,306,758 A | 4/1994 | Pellerite | |
| 5,353,996 A | 10/1994 | Gallacher et al. | |
| 5,365,890 A | 11/1994 | Johnston, Jr. et al. | |
| 5,376,289 A | 12/1994 | Montagna et al. | |
| 5,416,946 A | 5/1995 | Brown et al. | |
| 5,429,076 A | 7/1995 | Johnston, Jr. et al. | |
| 5,446,209 A | 8/1995 | Lagow | |
| 5,506,309 A | 4/1996 | Bierschenk et al. | |
| 5,509,607 A | 4/1996 | Booher et al. | |
| 5,543,567 A | 8/1996 | Bierschenk et al. | |
| 5,549,079 A | 8/1996 | Johnston, Jr. et al. | |
| 5,605,117 A | 2/1997 | Moskal | |
| 5,667,139 A | 9/1997 | Dickie | |
| 6,329,326 B1 | 12/2001 | Iso et al. | |
| 6,548,454 B1 | 4/2003 | Yamamoto et al. | |
| 6,581,549 B2 | 6/2003 | Stewart et al. | |

(Continued)

FOREIGN PATENT DOCUMENTS

DE   2117693 C   6/1983

(Continued)

OTHER PUBLICATIONS

TCM Industries: "Krytox Sootblower Grease SB"; Internet Article, 'Online! Jul. 20, 2004, XP002366996 Retrieved from the Internet: URL:http://www.tmcindustries.com/sootblower.htm> retrieved on Feb. 9, 2006] The publication date was assumed as the date at which the web page was last modified.

(Continued)

*Primary Examiner*—Walter D Griffin
*Assistant Examiner*—Frank C Campanell
(74) *Attorney, Agent, or Firm*—Kathryn M. Sanchez

(57) ABSTRACT

A method of lubricating a sootblower comprising use of an oil or grease that is thermally stable at temperatures of at least 160° C. Sootblower components which can be lubricated include lance support bearings, gears, chains, seals, and shaft bearings. The oil or grease can be an ester, silicone, or halogenated oil or grease including perfluoropolyether or perfluoroalkyl ether, a fluorosilicone, a polytrifluorochloroethylene, derivatized perfluoropolyethers, such as fluoroether triazines, and mixtures of two or more thereof.

30 Claims, No Drawings

U.S. PATENT DOCUMENTS

| | | |
|---|---|---|
| 6,780,363 B2 | 8/2004 | Palamone et al. |
| 2001/0031709 A1 | 10/2001 | Lenti et al. |
| 2003/0013923 A1 | 1/2003 | Marchionni et al. |
| 2003/0027732 A1 | 2/2003 | Howell et al. |
| 2003/0069144 A1 | 4/2003 | Iso |
| 2003/0148896 A1 | 8/2003 | Akiyama et al. |
| 2003/0187280 A1 | 10/2003 | Fontana et al. |
| 2003/0195125 A1 | 10/2003 | Akiyama |
| 2003/0196727 A1 | 10/2003 | Maccone |
| 2003/0203823 A1 | 10/2003 | Navarrini et al. |
| 2004/0102575 A1 | 5/2004 | Turri et al. |
| 2004/0176555 A1 | 9/2004 | Guarda et al. |
| 2004/0235685 A1 | 11/2004 | Russo et al. |

FOREIGN PATENT DOCUMENTS

| | | |
|---|---|---|
| JP | 61254697 | 11/1986 |
| JP | 1993009484 A | 1/1993 |
| JP | 05240251 | 9/1993 |
| JP | 2001132690 A | 5/2001 |
| JP | 2002088349 A | 3/2002 |
| JP | 2002357114 A | 12/2002 |
| JP | 2002357225 A | 12/2002 |
| JP | 2003021148 A | 1/2003 |
| JP | 2003239997 A | 8/2003 |
| JP | 2003269469 A | 9/2003 |
| JP | 2003343576 A | 12/2003 |
| JP | 2004003596 A | 1/2004 |
| JP | 2004026941 A | 1/2004 |
| JP | 2004068083 A | 3/2004 |
| WO | WO 02/06375 A2 | 1/2002 |

OTHER PUBLICATIONS

Blue Chip Lubricants: "Sootblower Grease SBG-295"; Internet Article, 'Online! Sep. 22, 2004, XP002366997 Retrieved from the Internet: URL:http://www.bcl.co.za/> retrieved on Feb. 9, 2006! The publication date was assumed as the date at which the web page was last modified.

Internet Archive Wayback Machine: "Sootblower Grease SBG-295"; Internet Article, 'Online! Sep. 22, 2004, Retrieved from the Internet: URL:http://web.archive.org/web/20040922101827/http://www.bcl.co.za/> 'retrieved on Feb. 9, 2006! Document establishing the publication date of the above citation based on the date of archiving by the Internet Archive Wayback Machine (www.archive.org).

Abstract—Holland; "Use of Perfluoroalkylpolyether Lubricants in Mechanically Driven Vacuum Pumps"; Vacuum, vol. 22 (1972), 6, p. 234.

Demorest et al.; "An Evaluation of Grease Type Ball Bearing Lubricants Operating in Various Environments (Status Report No. 2)"; Journal of the American Society of Lubrication Engineers; Lubrication Engineering, vol. 34 (1978), 2, pp. 137-145.

Hayman; "Basic Sootblower Operation and Maintenance", presented at Association of Rural Electric Generating Cooperatives Annual Meeting, Jun. 10-13, 1979; Biloxi Mississippi, USA; pp. 105.

Abstract—D'Agostino; "Tribological Behavior of Sintered Iron Bearings Self-Lubricated with PFPE [perfluoropolyethers] Under Severe Operating Conditions"; Tribology International, vol. 21 (1988), 2, pp. 105-108.

Carre; "Perfluoropolyalkylether Lubricants under Boundary Conditions: Iron Catalysis of Lubricant Degradation"; Journal of Synthetic Lubrication, vol. 6 (1989), Issue 1, pp. 3-15.

Barsin; "Recovery Boiler Sootblowers", presented at the TAPPI Kraft Recovery Operations Seminar, Jan. 1992.

Sadeghi et al.; "Performance Characteristics of Perfluoroalkylpolyether Synthetic Lubricants"; Tribology Transactions, vol. 39 (1996), 4, 849-854.

Walther et al.; "Maintenance Strategies to Improve Sootblower Availability", presented at the EPRI Fossil Plant Maintenance Conference, Jul. 29-Aug. 1, 1996; Baltimore, Maryland, USA; pp. 1-15.

Abstract—Jones; "Perfluoropolyether Lubricants"; Toraiborojisuto, vol. 42 (1997), 3, pp. 205-210.

Jones et al.; "Enhancement of Perfluoropolyether Boundary Lubrication Performance"; Journal of the Society of Tribologists and Lubrication Engineers; Lubrication Engineering, Jun. 1997, pp. 24-31.

Kavidass et al.; "B&W's IR-CFB Coal-Fired Boiler Operating Experiences", presented to the Pittsburgh Coal Conference, pp. 1-9, Sep. 14-18, 1998; Pittsburgh, Pennsylvania, USA.

Miyake; "Dust generation Properties of Solid Lubricant Film Coated and Perfluoropolyether Lubricated Ball Bearings"; Journal of Tribology, vol. 122 (2000), 4, pp. 796-802.

Jansen et al.; "Evaluation of Temperature and Material Combinations on Several Lubricants for Use in the Geostationary Operational Environmental Satellite (GOES) Mission Filter Wheel Bearings", NASA/TM 2001-21121, pp. 1-5.

Buckley; "IR Centac Utility Industry Handbook CST-TP0017"; Ingersoll-Rand Company, Dec. 1, 2001.

Nice; "How Gears Work" at URL: http://auto.howstuffworks.com/gear.htm.

Berger; High-Temperature Greases for Rolling Bearings; Int. J. of Applied Mechanics and Engineering (2002), vol. 7, No. 3, pp. 729-737.

Abstract—Miyasaka et al.; "Effect of Perfluoropolyether Lubricants on the Tribological Properties of a Sintered Alloy", Toraiborojisuto, vol. 48 (2003), Issue 5, pp. 402-409.

\* cited by examiner

METHOD FOR LUBRICATING A SOOTBLOWER

FIELD OF THE INVENTION

The present invention generally relates to sootblowers which are used to project a stream of cleaning fluid, especially steam, against interior surfaces of combustion devices, such as boilers, to clean the surfaces. In particular, this invention concerns a method of lubricating a sootblower, especially sootblower bearings, gears, and seals to reduce maintenance and improve reliability of sootblower performance.

BACKGROUND OF THE INVENTION

Trademarks and trade names used herein are shown in upper case.

Sootblowers are an integral part of temperature control on combustion devices such as steam generators, furnaces and boilers. Sootblowers are cleaning devices which are used to remove deposits of soot, ash and debris from surfaces, such as furnace walls, and the surfaces of heat exchange tubes, particularly on the surfaces of tubes located within combustion devices. During operation of a combustion device, hot combustion gases from a boiler or furnace pass over the heat exchange tubes, which are generally provided in clusters of tubes, whereby the tubes absorb heat and thus heat the contents of each tube in the usual heat exchange function. Soot or ash generated from the combustion of fuel, deposit on the tubes, insulating the tubes, and making the tubes less effective as heat exchange units. Therefore, the tubes must be periodically thoroughly cleaned. Sootblowers, using air, steam or water under high pressure, literally blow deposits off surfaces and thus prevent deposits from insulating the tubes, which would reduce the exchange or transfer of heat by the tubes and adversely affect their function. Therefore, proper operation of the sootblower is essential to proper operation of a furnace or other combustion device.

Significant effort is devoted to sootblower maintenance. Many components are designed such that they can be replaced or repaired in place if they fail. Without proper maintenance, catastrophic failure of the sootblower may occur, requiring total replacement. Replacement is expensive and involves not only cost to replace the sootblower, but also freight and handling charges, installation, equipment downtime, including possible reduction of efficiency, etc. Sootblower manufacturers recommend preventative maintenance programs.

Critical to the operation of sootblowers is proper lubrication. In practice, the sootblower has a number of parts, including gears, bearings and seals, that require lubrication in order to maintain performance. Lubricants, especially in the gear box and in bearings and seals are exposed to high temperature, for example, 300° to 850° F. (150° to 454° C.) and high pressure, for example, 50 to 700 psig (345 kPa to 2413 kPa). Degradation and leaks of lubricant are frequent causes of sootblower maintenance problems, and, if not addressed, may lead to catastrophic failure.

Hydrocarbon oils, hydrocarbon-based greases, synthetic hydrocarbon oils and synthetic hydrocarbon-based greases, and mixtures thereof, are the most common lubricants utilized in sootblowers. These oils and greases degrade and/or oxidize into tars over time in the high temperature environment in which the sootblower operates, thereby causing premature sootblower failure. These oils and greases may leak or worse, form hard varnish layers, again leading to premature sootblower failure. Sootblower failure due to failure of seals, bearings, and/or gears, reduces equipment capacity, such as boiler, capacity and increases maintenance costs. Use of full-flow circulating oil baths on gear sets, gaskets and shaft surfaces has improved reliability of synthetic hydrocarbon oils and greases.

There remains a need for a method for lubricating sootblowers for longer and more reliable performance, with reduced, and even elimination of, maintenance of sootblower lubrication systems. The present invention meets these needs.

SUMMARY OF THE INVENTION

The present invention comprises a method of lubricating a sootblower comprising lubricating one or more of sootblower bearings, gears, chains, seals and shafts with a thermally and oxidatively stable oil or grease having a viscosity of at least 25 centistokes at 40° C. By "thermally and oxidatively stable" it is meant that the oil or grease is stable; that is, does not degrade, at temperatures of at least 160° C. One aspect of this invention provides a method of lubricating a sootblower wherein the sootblower comprises (a) a lance tube having one or more nozzles at the forward end of the tube; (b) a lance hub rigidly attached to the rear end of the lance tube; (c) lance support bearings, which attach to the lance tube through the lance hub, allowing for the rotation of the lance tube; (d) a drive train connected to the lance hub wherein the drive train comprises a set of gears or chains or combinations of these; (e) shafts on which the gears or chains of the drive train are mounted; and (f) shaft bearings and seals on which the shafts are mounted; the method comprising lubricating one or more of the lance support bearings, gears, chains, seals, and shaft bearings with a thermally and oxidatively stable oil or grease having a viscosity of at least 25 centistokes at 40° C. Preferably more than one of the lance support bearings, gears, chains, seals and shaft bearings are lubricated with the oil or grease; more preferably each of the lance support bearings, gears, chains, seals and shaft bearings are lubricated with the oil or grease.

The thermally and oxidatively stable oil or grease can be any esters, silicones and halogenated oils and greases including perfluoropolyethers or perfluoroalkyl ethers, fluorosilicones, polytrifluorochloroethylenes, and derivatized perfluoropolyethers, such as fluoroether triazines, and mixtures of two or more thereof, having a viscosity of at least 25 centistokes at 40° C. Preferably the oil or grease is a halogenated oil or grease. More preferably the oil or grease comprises one or more of perfluoropolyether, derivatized perfluoropolyether, and polychlorotrifluoroether.

In an alternative embodiment, the drive train is housed in a gearbox. This invention then provides a method of lubricating a sootblower which comprises a drive train housed in a gearbox, the method comprising charging the gearbox with a thermally and oxidatively stable oil or grease having a viscosity of at least 25 centistokes at 40° C.

In a second aspect of this invention, there is provided a method to clean and lubricate a sootblower comprising (a) contacting sootblower components with an oil-and-grease-solubilizing solvent to clean the surface; (b) drying the cleaned components; (c) lubricating the dried components with a thermally and oxidatively stable oil or grease having a viscosity of at least 25 centistokes at 40° C., and (d) assembling the components to provide a lubricated sootblower.

In a first embodiment of the second aspect of this invention, the sootblower has not been in operation and sootblower components are provided by sootblower manufacturer wherein sootblower components comprise a lance tube having one or more nozzles at the forward end of the tube, a lance hub, lance support bearings, a drive train comprising a set of gears or chains or combinations of these, gear shafts, seals and shaft bearings. In this embodiment, the solvent removes compounds coated onto component surfaces by the manufacturer to prevent rust. Such compounds are commonly referred to as "slushing compounds".

In a second embodiment of the second aspect of this invention, the sootblower has been in operation and the method comprises prior to step (a) of contacting components with a solvent, the steps (e) removing a sootblower from operation and (f) disassembling the sootblower to provide components comprising a lance tube having one or more nozzles at the forward end of the tube, a lance hub, lance support bearings, a drive train comprising a set of gears or chains or combinations of these, gear shafts, seals and shaft bearings. In this embodiment, the components are contacted with the solvent to remove the used oil or grease. In addition, degradation products of the previously used oil or grease are removed by the solvent.

Preferably the sootblower in both the first and second embodiments comprises (a) a lance tube having one or more nozzles at the forward end of the tube; (b) a lance hub rigidly attached to the rear end of the lance tube; (c) lance support bearings, which attach to the lance tube through the lance hub, allowing for the rotation of the lance tube; (d) a drive train connected to the lance hub wherein the drive train comprises a set of gears or chains or combinations of these; (e) shafts on which the gears or chains of the drive train are mounted; and (f) shaft bearings and seals on which the shafts are mounted. Preferably, the sootblower components cleaned with the solvent are the lance support bearings, the gears or chains of the drive train, the shafts, the seals and the shaft bearings.

Surprisingly, it has been found that by using a thermally and oxidatively stable oil or grease having a viscosity of at least 25 centistokes at 40° C., in a sootblower, maintenance of the lubrication system of the sootblower may be substantially eliminated.

DETAILED DESCRIPTION OF THE INVENTION

The present invention provides methods to improve lubrication of sootblowers, and more particularly to improving lubrication by using a thermally and oxidatively stable oil or grease having a viscosity of at least 25 centistokes at 40° C. Sootblowers comprise a number of components that require lubrication during operation. These components are susceptible to failure under the high temperature conditions in which sootblowers operate. This invention overcomes the problems heretofore encountered in lubricating sootblowers by providing a method of lubricating a sootblower comprising lubricating one or more of sootblower bearings, gears, chains, seals, and shafts with a thermally and oxidatively stable oil or grease having a viscosity of 25 centistokes at 40° C. Sootblowers lubricated by the methods of this invention have longer life, that is, do not fail for periods of time surprisingly and significantly beyond the time in which sootblowers lubricated with synthetic hydrocarbon lubricants fail. Such hydrocarbon lubricants are not thermally and oxidatively stable, as defined herein.

The present invention is particularly suitable for long retractable sootblowers. In the operation of a long retractable sootblower, steam is delivered through a lance tube to a combustion device, such as a boiler, to clean walls and tubes. The lance tube is an elongated tube having one or more nozzles at the forward end and rigidly attached to a lance hub at the rear end. The forward end of the lance tube is the end facing the surface to be cleaned. Steam is introduced through a poppet valve to a feed tube, which is telescopically located within the lance tube. The poppet valve and feed tube are connected to the lance tube through the lance hub. The lance hub houses a packing assembly charged with packing material to facilitate projection and retraction of the feed tube/lance tube assembly. Steam is delivered through the feed tube to the nozzle(s) of the lance tube to clean the boiler walls and tubes.

The lance tube is rigidly attached to the lance hub and to a driving carriage. The carriage is engaged with a track attached to a frame housing the sootblower. The carriage moves along the track advancing the lance tube into the boiler or other combustion device through a drive train. An electric motor provides energy for the drive train to provide for translation of the carriage and rotation of the lance tube. Rotation of the lance tube is important for efficient and effective cleaning during sootblower operation. The carriage may also provide housing for the drive train and the lance hub.

The drive train comprises a set of gears or chains or combinations of these. The drive train provides means for speed reduction/torque multiplication, which is necessary to translate the energy supplied by the motor to usable energy for translation of the carriage and rotation of the lance tube. The gears and/or chains are mounted on shafts. These shafts are mounted on seals and shaft bearings. The gears, seals and shaft bearings require lubrication.

Lance support bearings on the lance hub attach the lance tube to the gears or chains of the drive train. The lance support bearings support lance tube rotation and require lubrication.

The gears and/or chains may be housed in an enclosure, such as a gearbox. Optionally, the lance support bearings are also housed in an enclosure. This enclosure may be separate from or the same that houses the gears or chains, that is, the gearbox. When gears, chains and/or lance support bearings are housed in an enclosure, such as a gearbox, the enclosure may be charged with an oil or grease according to this invention for lubricating the gears, chains and/or lance support bearings. By "charged with an oil or grease," it is meant the oil or grease used in the method of this invention is added to the gearbox or other enclosure. Manufacturers typically provide guidance on the level to which a gearbox should be filled.

The present invention provides a method to lubricate a sootblower comprising lubricating one or more of sootblower bearings, gears, chains, seals and shafts with a thermally and oxidatively stable oil or grease having a viscosity of at least 25 centistokes at 40° C. Bearings include lance support bearings and/or shaft bearings. The method further provides, in a sootblower comprising a gearbox housing the drive train, lubricating a sootblower by charging the gearbox with a thermally oxidatively stable oil or grease lubricant having a viscosity of at least 25 centistokes at 40° C.

The present invention further provides a method to clean and lubricate a sootblower. This method comprises (a) contacting sootblower components with an oil-and-grease-solubilizing solvent to clean the surface; (b) drying the cleaned components; (c) lubricating the dried components with a thermally oxidatively stable oil or grease lubricant having a viscosity of at least 25 centistokes at 40° C., and (d) assembling the components to provide a lubricated sootblower. By "oil-and-grease-solubilizing solvent", it is meant common organic solvents that are capable of dissolving hydrocarbon-based oils and greases and related compounds. Typical of such solvents are liquid hydrocarbons, such as n-hexane, kerosene, gasoline, D-Crude™ 1 agent solution (available from Halliburton Company, Houston, Tex.), or those cleaning and degreasing solvents supplied by Excalibur Chemicals Limited, Swindon, UK.

In one embodiment of this method, the sootblower had not been in previous operation. The sootblower components are provided by a sootblower manufacturer and comprise a lance tube having one or more nozzles at the forward end, a lance hub connected to the lance tube at the rear end through lance support bearings, a drive train comprising a set of gears or chains or combinations of these, gear shafts, seals, and shaft bearings. In this embodiment, care must be taken to thoroughly clean the sootblower components. Typically, a manufacturer of sootblower components will coat components with "slushing" compounds that must be removed. Slushing compounds are compounds coated onto sootblower components, particularly bearings, gears, and shafts, to prevent rust. Slushing compounds are traditionally hydrocarbon-based and are incompatible with the lubricants used in this invention. The oil-and-grease-solubilizing solvent removes slushing compounds from component surfaces.

In a second embodiment, the sootblower had been in operation and the method first comprises removing a sootblower from operation and disassembling its components wherein the components comprise a lance tube having one or more nozzles at the forward end, a lance hub connected to the lance tube at the rear end through lance support bearings, a drive train comprising a set of gears or chains or combinations of these, gear shafts, seals, and shaft bearings. In this embodiment, particularly when the sootblower was previously lubricated with hydrocarbon oil or grease, all traces of the oil or grease should be removed because hydrocarbon oils and greases are incompatible with the thermally and oxidatively stable oils and greases used in this invention. Furthermore, varnish (product of degraded oil or grease) should also be removed using the oil and grease solubilizing solvent.

Once thoroughly cleaned, the components are dried. The dried components are then lubricated with a thermally oxidatively stable oil or grease lubricant having a viscosity of at least 25 centistokes at 40° C. For sootblowers comprising a gearbox or other enclosure housing the drive train and/or lance support bearings, the gearbox or other enclosure may be charged with an oil or grease useful in this invention to a level appropriate for sootblower performance, per manufacturer's instructions. The lubricated components are then assembled to provide a lubricated sootblower with reliable performance and reduced or eliminated need for maintenance of the sootblower lubrication system. The sootblower components are assembled according to instructions by the sootblower manufacturer.

Lubricating oils and greases useful in the present invention include esters and silicones as well as halogenated oils and greases based on halogenated oils that are thermally and oxidatively stable. The term "halogenated oil" as used herein includes a perfluoropolyether or perfluoroalkyl ether, a fluorosilicone, a polytrifluorochloroethylene, and derivatized perfluoropolyethers, such as fluoroether triazines. Two or more oils and/or greases may also be used. Such oils and greases are thermally and oxidatively stable, that is, do not degrade, at temperatures of at least 160° C., and may be stable up to temperatures of 399° C., or higher. Preferably, the oil or grease is thermally and oxidatively stable at temperatures of at least 204° C., more preferably, at temperatures of at least 250° C. Most preferred oils and greases show no oxidative degradation, that is, are resistant to thermal oxidation for an indefinite period at temperatures less than 300° C.

The oils and greases useful in this invention have a viscosity of at least 25 centistokes at 40° C. Preferably, the oils and greases have a viscosity of at least 100 centistokes, more preferably at least 220 centistokes and most preferably at least 460 centistokes at 40° C.

The oil or grease useful in this invention may further comprise one or more additives to enhance physical properties of the oil or grease and to improve performance in use.

The oil or grease is preferably a halogenated oil or grease and more preferably, a perfluoropolyether or perfluoroalkyl ether, such as those produced by E. I. du Pont de Nemours and Company, Wilmington, Del. under the trademark, "KRYTOX"; Ausimont, S.p.A., Milan, Italy under the trademarks, "FOMBLIN"; and Daikin Industries, Japan under the trademark, "DEMNUM").

A common characteristic of perfluoropolyethers is the presence of perfluoroalkyl ether moieties. Perfluoropolyether is synonymous with perfluoropolyalkylether and perfluoroalkyl ether. Other synonymous terms frequently used include "PFPE", "PFPE oil", "PFPE fluid", and "PFPAE".

A preferred perfluoropolyether is a poly(hexafluoropropylene oxide), such as those sold under the "KRYTOX" trademark. These materials are produced by anionic polymerization of hexafluoropropylene epoxide as described by Moore in U.S. Pat. No. 3,332,826, herein incorporated by reference. The resulting poly(hexafluoropropylene oxide) PFPE fluid is a perfluoropolyether having the formula of $CF_3-(CF_2)_2-O-[CF(CF_3)-CF_2-O]_s-R_f$. In the formula, s is 2-100, inclusive and $R_f$ is $CF_2CF_3$, a $C_3$ to $C_6$ perfluoroalkyl group, or combinations thereof. In particular, KRYTOX 143 AD and KRYTOX XHT-500 are especially suitable, due to their capability to perform at higher temperatures, with KRYTOX XHT-500 being most preferred for the higher temperature applications.

FOMBLIN fluids, available from Ausimont, Milan, Italy and produced by perfluoroolefin photooxidation, can also be used. FOMBLIN-Y can have the formula of $CF_3O(CF_2CF(CF_3)-O-)_m(CF_2-O-)_n-R^1_f$. Also suitable is $CF_3O[CF_2CF(CF_3)O]_m(CF_2CF_2O)_o(CF_2O)_n-R^1_f$. In the formulae $R^1_f$ is $CF_3$, $C_2F_5$, $C_3F_7$, or combinations of two or more thereof; (m+n) is 8-45, inclusive; and m/n is 20-1000, inclusive; o is >1; (m+n+o') is 8-45, inclusive; m/n is 20-1000, inclusive.

FOMBLIN-Z can have the formula of $CF_3O(CF_2CF_2-O-)_p(CF_2-O)_qCF_3$ where (p+q) is 40-180 and p/q is 0.5-2, inclusive.

DEMNUM fluids, available from Daikin Industries, Japan, can also be used. These fluids can be produced by sequential oligomerization and fluorination of 2,2,3,3-tetrafluorooxetane, yielding the formula of $F-[(CF_2)_3-O]_t-R^2_f$ where $R^2_f$ is $CF_3$, $C_2F_5$, or combinations thereof and t is 2-200, inclusive.

Other suitable perfluoropolyether oils and greases are described in U.S. Pat. No. 6,753,301, the teachings of which are incorporated herein by reference.

Fluorosilicones suitable for use in the invention can be any fluorocarbon containing silicone fluid having had a viscosity of at least 25 centistokes at 40° C., which are thermally and oxidatively stable. The preferred fluorosilicone is a fluorosilane, a fluorosiloxane, or combinations thereof. A suitable fluorosilicone can have the formula of $R_f-(CH_2)_{n'}-Si-R^2_3$ in which $R_f$ can be the same as disclosed above, n' can be 1 to 100, and each $R^2$ can be independently an alkyl group, an alkoxy group, a thioalkyl group, an amino group, an aryl group, or combinations of two or more thereof. An example of suitable fluorosilicone is DOW CORNING FS-1265 fluorosilicone oil from Dow Corning, Midland, Mich.

Polytrifluorochloroethylenes suitable for use in the invention can have the formula of $(-CCl_2CFCl-)_{s'}$ where s' is the same as s, as disclosed above, being, 2-100. Example of suitable polytrifluorochloroethylenes are HALOCARBON oils from Halocarbon, Riveredge, N.J. The preferred polytrifluorochloroethylene is HALOCARBON 200.

Greases comprise an oil and a thickening agent, made by the addition of thickening agents, for instance, finely divided silica, boron nitride, clay, soaps, or poly(tetrafluoroethylene) to oils useful in this invention. Formulations for greases based on halogenated oils are well known to one skilled in the art. Thickening agents include, but are not limited to, polytetrafluoroethylene, talc, silica, clay, boron nitride, metal soaps, titanium dioxide, polydimethylsiloxane, polyurea, polyurethane or combinations of two or more thereof.

The oil or grease useful in this invention may further comprise one or more additives. Additives are typically present in minor amounts. Such additives may be for example, perfluoroalkyl surfactants or polyoxyperfluoroalkyl surfactants. The oil or grease may comprise other additives known in the art such as a stabilizer, anticorrosive agent, or anti-wear agent. Examples of additives include those disclosed in U.S. Pat. Nos. 4,818,619; 6,184,187; 6,559,108 and U.S. patent applications U.S. 2003-0203823-A1 and U.S. 2004-0235685-A1, the teachings of which are incorporated herein by reference.

The present invention provides a superior method for lubricating components of a sootblower that are susceptible to failure due to high temperature conditions. Although much of previous discussion applies to long retractable sootblowers, the present invention is also advantageous to lubricate other types of sootblowers, such as wall sootblowers, oscillating blowers, and extended lance blowers, among others. Depending on the type of sootblower, one skilled in the art will be able to adjust the method to account for the design differences and differences in lubrication needs. For example, a wall sootblower is mounted directly onto the wall of the boiler. Operation of a wall sootblower is essentially the same as operation of a long retractable sootblower without the translation movement. The gears, seals and bearings in the wall sootblower and other types of sootblowers require lubrication.

While this invention provides a method to lubricate a sootblower, and specifically names sootblower components, lance support bearings, gears and/or chains of a drive train, seals, and shaft bearings, it should be recognized by those skilled in the art that sootblower operation may benefit by lubricating other sootblower components with thermally oxidatively stable oil or grease lubricant having a viscosity of at least 25 centistokes at 40° C. For example, it may be advantageous to include a thermally oxidatively stable oil or grease lubricant having a viscosity of at least 25 centistokes at 40° C. to the packing material of the packing assembly. It may also be advantageous to use a thermally stable oil or grease to lubricate the driving carriage and track upon which the carriage advances the lance tube to the boiler or combustion device. Other variations of this invention will be obvious to one skilled in the art.

EXAMPLES

Example 1

Long retractable sootblowers are tested on a bench comparing the performance of KRYTOX SB Grease, available from E. I. du Pont de Nemours and Company, Wilmington, Del., to the performance of mineral oil lubricants under conditions replicating normal operations on a black-liquor boiler. DIAMOND POWER IK-525 PRE-SERIES 1 carriages, available from Diamond Power International, Inc., Lancaster, Ohio, were chosen to allow the separate validation of the gear train performance while isolating the highest temperature area of the lance spool cavity and support bearings. The carriages were prepared by complete disassembly and thorough washing/degreasing of all internal parts with Stoddard solvent, available from EM Science, Gibbstown, N.J. followed by reassembly with all new bearings and gears/shafts in as new condition. The test rig is comprised of two identical sootblower carriages bolted in a stationary position to a bench top. Each carriage is instrumented with a cartridge heater inserted from the back into the lance spool, replicating the heat normally generated by the passing of steam, with a thermocouple and control circuitry; a strip chart recorder for documentation of the inner spool temperature; motor, starter and reversing timer for lance rotation. A weight simulating the steam lance is bolted to the front flange of each lance spool. The carriages were operated continuously at elevated temperature to accelerate the test. Temperatures were monitored at seven separate locations on the exterior of the carriage to monitor heat propagation as well as localized typical operating temperatures.

In a comparative test, lubricants were applied to the hydrocarbon-lubricated carriage according to OEM recommendations; about 6.6 lbs of oil in the gearbox and about 2.8 lbs in the lance hub including bevel gearing and lance support bearings. In this test, hydrocarbon oil/grease were used. The gear box was charged with PENNZOIL 10W-30 Oil, available from Pennzoil Products Company, Houston, Tex. The lance hub and bearings were lubricated with ALMASOL 1250 HT, available from Lubrication Engineers, Inc., Fort Worth, Tex.

In a second test, KRYTOX SB Grease was used in both the gear box and lance hub. The amount of lubricant used in the KRYTOX SB Grease-lubricated carriage was reduced by volume to increase the severity of the test when this grease was used and to provide indication of what the minimum level of grease required might be; about 9.5 lbs in the gearbox and about 5.5 lbs in the lance hub including bevel gearing and lance support bearings. Duplicating the recommended OEM fill levels (used with the hydrocarbons) would have required about 14.7 lbs in the gearbox and 6.5 lbs in the lance hub.

Certain simple modifications were made to the KRYTOX SB Grease-lubricated carriage for adaptation to grease lubrication and to improve its durability. Pin-hole vents in the top carriage housing cover and in the lance spool housing side cover were replaced with filtered breathers, all grease zerks were removed and the holes plugged, oil site gauge was removed and the hole plugged, the lance spool support bearings were installed so that the attached shield was toward the outside of the enclosure towards the seal backwards in respect to the OEM instructions.

Information obtained from surveys indicates that severe operating conditions consist of an operating cycle of approximately 3 minutes of operation every 2 hours with a superheated steam pressure of about 200 psi or about 400° F. and the most severe operation consists of 6 minutes of operation every hour with a superheated steam pressure of up to 600 psi or about 650° F. The test carriages operated continuously at a temperature that would limit the external spool temperature to approximately 400° F. The rate of cycle reversing in the test was reduced to 5 cycles per hour or 12 minutes per cycle to reduce the strain on the electric motors as they were not being tested and the number of reverses were determined to be of minimal impact to the test results. Operating under these conditions simulated up to 5 years service (based on the most severe 6 minutes operation per hour) in 6 months of testing as the cycling carriage may only reach their maximum temperature for a few minutes each cycle.

In the comparative test, the hydrocarbon-lubricated carriage failed by severe lance spool bearing wear followed by bearing seizure in about 3 months (2.5 years simulated service based on 6 minutes operation per hour). Evaluation of the gear train exhibited significant wear of the bronze worm gear and internally lubricated bearing wear. Corrosion of the worm gear was also observed. The grease in the lance hub had almost completely dried out. No grease was found in the rear lance support bearing, which froze in service. This bearing showed considerable wear. The cage was broken on the front lance support bearing, which showed a lack of lubrication.

The test of the KRYTOX SB Grease-lubricated carriage was allowed to run for twice the time (6 months testing time or 5 years simulated service based on 6 minutes operation per hour). The test using KRYTOX SB Grease terminated without failure or significant wear of gearing or bearings. The carriage was inspected and disassembled. The gears appeared to be in good condition and well-lubricated. The lance hub housing appeared well-lubricated.

Example 2

A long retractable sootblower on a paper mill black-liquor boiler was tested to evaluate the performance of KRYTOX SB Grease using a DIAMOND POWER IK-525 SERIES 1 carriage to evaluate performance in a single reservoir carriage system. After cleaning all parts, the lance hub housing and gear box were charged with KRYTOX SB Grease. This carriage was filled with approximately 21 lbs of grease to simulate the OEM recommended oil fill level. The carriage was placed into service and inspected 162 days later and continued in operation for over 150 more days. Previous operation of this sootblower carriage at this site, using greases which were not thermally and oxidatively stable as defined herein, generally start leaking oil within 90 days in service and require oil changes approximately every 90 days. The KRYTOX SB Grease-lubricated carriage did not leak and has required no service.

What is claimed is:

1. A method for lubricating a sootblower wherein the sootblower comprises (a) a lance tube having one or more nozzles at the forward end of the tube; (b) a lance hub rigidly attached to the rear end of the lance tube; (c) lance support bearings, which attach to the lance tube through the lance hub, allowing for the rotation of the lance tube; (d) a drive train connected to the lance hub wherein the drive train is housed in a gearbox and comprises a set of gears or chains or combinations of these; (e) shafts on which the gears or chains of the drive train are mounted; and (f) shaft bearings and seals on which the shafts are mounted, the method comprising charging the gearbox with a thermally and oxidatively stable grease having a viscosity of at least 25 centistokes at 40° C. wherein the grease comprises a halogenated oil and a thickening agent.

2. The method of claim 1 wherein grease is thermally and oxidatively stable at temperatures of at least 204° C.

3. The method of claim 2 wherein the grease is thermally and oxidatively stable at temperatures of at least 250° C.

4. The method of claim 1 wherein the grease has a viscosity of at least 100 centistokes at 40° C.

5. The method of claim 4 wherein the grease has a viscosity of at least 220 centistokes at 40° C.

6. The method of claim 5 wherein the grease has a viscosity of at least 460 centistokes at 40° C.

7. The method of claim 1 wherein the drive train comprises a set of gears.

8. The method of claim 1 further comprising lubricating more than one of the lance support bearings, gears, chains, seals, and shaft bearings with the grease.

9. The method of claim 8 wherein each of the lance support bearings, gears, chains, seals, and shaft bearings are lubricated with the grease.

10. The method of claim 1 wherein the halogenated oil is a perfluoropolyether oil.

11. The method of claim 10 wherein the perfluoropolyether is a poly(hexafluoropropylene oxide).

12. The method of claim 1 wherein the thickening agent is polytetrafluoroethylene, talc, silica, clay, boron nitride, metal soaps, titanium dioxide, polydimethylsiloxane, polyurea, polyurethane or combinations of two or more thereof.

13. The method of claim 12 wherein the halogenated oil is a perfluoropolyether.

14. The method of claim 13 wherein the perfluoropolyether is a poly(hexafluoropropylene oxide).

15. The method of claim 1 wherein the grease further comprises one or more additives.

16. The method of claim 15 wherein the additive is as a stabilizer, anticorrosive agent, or anti-wear agent.

17. A method for lubricating a sootblower wherein the sootblower comprises (a) a lance tube having one or more nozzles at the forward end of the tube; (b) a lance hub rigidly attached to the rear end of the lance tube; (c) lance support bearings, which attach to the lance tube through the lance hub, allowing for the rotation of the lance tube allowing for the rotation of the lance tube; (d) a drive train connected to the lance hub wherein the drive train is housed in a gearbox and comprises a set of gears or chains or combinations of these; (e) shafts on which the gears or chains of the drive train are mounted; and (f) shaft bearings and seals on which the shafts are mounted; the method comprising charging the gearbox with a grease comprising a halogenated oil and a thickening agent having a viscosity of at least 460 centistokes at 40° C., wherein the grease is thermally and oxidatively stable at temperatures of at least 250° C.

18. A method to clean and lubricate a sootblower wherein the sootblower comprises (i) a lance tube having one or more nozzles at the forward end of the tube; (ii) a lance hub rigidly attached to the rear end of the lance tube; (iii) lance support bearings, which attach to the lance tube through the lance hub, allowing for the rotation of the lance tube; (iv) a drive train connected to the lance hub wherein the drive train is housed in a gearbox and comprises a set of gears or chains or combinations of these; (v) shafts on which the gears or chains of the drive train are mounted; and (vi) shaft bearings and seals on which the shafts are mounted, the method comprising (a) contacting the gearbox with an oil and grease solubilizing solvent to clean the surface; (b) drying the cleaned gearbox; (c) charging the dried gearbox with a thermally and oxidatively stable grease comprising a halogenated oil and a thickening agent having a viscosity of at least 25 centistokes at 40° C., and (d) assembling the components to provide a lubricated sootblower.

19. The method of claim 18 wherein the sootblower had not been in operation.

20. The method of claim 18 wherein the sootblower had been in operation and the method comprises prior to step (a), the steps: (e) removing a sootblower from operation and (f) disassembling the sootblower.

21. The method of claim 18 wherein the grease is thermally and oxidatively stable at temperatures of at least 204° C.

22. The method of claim 21 wherein the grease is thermally and oxidatively stable at temperatures of at least 250° C.

23. The method of claim 18 wherein the grease has a viscosity of at least 100 centistokes at 40° C.

24. The method of claim 23 wherein the grease has a viscosity of at least 220 centistokes at 40° C.

25. The method of claim 24 wherein the grease has a viscosity of at least 460 centistokes at 40° C.

26. The method of claim 18 wherein the halogenated oil is a perfluoropolyether oil.

27. The method of claim 26 wherein the perfluoropolyether is a poly(hexafluoropropylene oxide).

28. The method of claim 18 wherein the thickening agent is polytetrafluoroethylene, talc, silica, clay, boron nitride, metal soaps, titanium dioxide, polydimethylsiloxane, polyurea, polyurethane or combinations of two or more thereof.

29. The method of claim 18 wherein the grease further comprises one or more additives.

30. The method of claim 29 wherein the additive is as a stabilizer, anticorrosive agent, or anti-wear agent.

* * * * *